United States Patent

Blattmann-Bleile et al.

[11] Patent Number: 5,884,311
[45] Date of Patent: Mar. 16, 1999

[54] METHOD AND SYSTEM FOR DYNAMICALLY CONFIGURING A RELATIONAL DATABASE

[75] Inventors: Marion C. Blattmann-Bleile, Bremgareten; Udo Leisten, Stuttgart; Nicole Rittershofer, Waghäusel, all of Germany

[73] Assignee: International Business Machines Corporation, Armonk, N.Y.

[21] Appl. No.: 716,006

[22] Filed: Sep. 19, 1996

[30] Foreign Application Priority Data

Sep. 20, 1995 [DE] Germany ............ 195 34 819.2

[51] Int. Cl.[6] ........................ G06F 17/30
[52] U.S. Cl. ................... 707/10; 707/1; 707/5; 707/104; 395/200.3
[58] Field of Search ............ 707/10, 1–5, 104; 395/200.3, 200.43, 200.44

[56] References Cited

U.S. PATENT DOCUMENTS 5,335,345  8/1994  Frieder et al. ................. 707/5
5,412,806  5/1995  Du et al. ....................... 707/2

OTHER PUBLICATIONS

"Scheduling the Allocation of Data Fragments in a Distributed Database Environment: A Machine Learning Approach," Chaturvedi et al. IEEE Transactions on Engineering Management, vol. 41, No. 2, pp. 194–207, May 1994.

*Primary Examiner*—Wayne Amsbury
*Assistant Examiner*—Hosain T. Alam
*Attorney, Agent, or Firm*—Gray Cary Ware Freidenrich

[57] ABSTRACT

The invention relates to a method and system for configuring a database 110, in particular by splitting data objects. This splitting process is frequently termed FRAGMENTATION in database technology. The invention furthermore relates to a method and system for distributing data objects in a database 110. This process is frequently termed ALLOCATION in database technology. Configuration of the database 110 is controlled by the information as to which processes 101, 102, 103 access the data objects of the database 110 in what way and to what extent. In particular, the configuration of distributed databases is controlled by the information as to which processes 101, 102, 103 read from and write to which attributes of the relations, at what frequency. Account is also taken of the locations at which the processes 101, 102, 103 are running. The database 110 can be configured both on initial startup and dynamically during database 110 operation, in order to respond to changed user behavior for instance.

11 Claims, 13 Drawing Sheets

| Business sub-processes Attributes | sg1 | sg2 | sg3 | sg4 | sg5 | sg6 | sg7 |
|---|---|---|---|---|---|---|---|
| Order# | 0 | 0 | 0 | 0 | 0 | 0 | 0 |
| Customer# | 0 | 0 | 0 | 0 | 0 | 0 | 0 |
| Product# | 0 | 0 | 0 | 0 | 0 | 0 | 1 |
| Date | 0 | 0 | 0 | 0 | 0 | 0 | 1 |
| Item | 0 | 0 | 0 | 0 | 0 | 0 | 0 |
| ItemValue | 0 | 0 | 0 | 0 | 0 | 0 | 1 |
| TotalValue | 0 | 0 | 0 | 0 | 0 | 0 | 0 |
| Status | 0 | 0 | 0 | 0 | 0 | 0 | 0 |

*FIG. 6B*

| Business sub-processes Attributes | sg1 | sg2 | sg3 | sg4 | sg5 | sg6 | sg7 |
|---|---|---|---|---|---|---|---|
| Order# | 0 | 0 | 0 | 0 | 0 | 0 | 0 |
| Customer# | 0 | 0 | 0 | 0 | 1 | 1 | 0 |
| Product# | 0 | 0 | 0 | 0 | 0 | 0 | 0 |
| Date | 0 | 0 | 0 | 0 | 0 | 1 | 0 |
| Item | 0 | 0 | 0 | 0 | 0 | 0 | 0 |
| ItemValue | 0 | 0 | 0 | 0 | 0 | 0 | 0 |
| TotalValue | 0 | 0 | 0 | 0 | 0 | 1 | 0 |
| Status | 0 | 0 | 0 | 0 | 1 | 0 | 0 |

*FIG. 6A*

| Business sub-processes Attributes | sg1 | sg2 | sg3 | sg4 | sg5 | sg6 | sg7 |
|---|---|---|---|---|---|---|---|
| Order# | 0 | 0 | 1 | 0 | 0 | 0 | 0 |
| Customer# | 0 | 0 | 1 | 0 | 0 | 0 | 0 |
| Product# | 0 | 0 | 1 | 0 | 0 | 0 | 0 |
| Date | 0 | 0 | 1 | 0 | 0 | 0 | 0 |
| Item | 0 | 0 | 1 | 0 | 0 | 0 | 0 |
| ItemValue | 0 | 0 | 1 | 0 | 0 | 0 | 0 |
| TotalValue | 0 | 0 | 1 | 0 | 0 | 0 | 0 |
| Status | 0 | 0 | 1 | 0 | 0 | 0 | 0 |

*FIG. 6C*

| Locations Business sub-processes | Berlin | London | Tokyo |
|---|---|---|---|
| sg1 | 0 | 0 | 0 |
| sg2 | 0 | 0 | 0 |
| sg3 | 0 | 0 | 0 |
| sg4 | 0 | 0 | 0 |
| sg5 | 0 | 15 | 25 |
| sg6 | 13000 | 0 | 14000 |
| sg7 | 0 | 0 | 0 |

*FIG. 7A*

| Locations<br>Business sub-processes | Berlin | London | Tokyo |
|---|---|---|---|
| sg1 | 0 | 0 | 0 |
| sg2 | 0 | 0 | 0 |
| sg3 | 0 | 0 | 0 |
| sg4 | 0 | 0 | 0 |
| sg5 | 0 | 0 | 0 |
| sg6 | 0 | 0 | 0 |
| sg7 | 15000 | 0 | 0 |

*FIG. 7B*

| Locations<br>Business sub-processes | Berlin | London | Tokyo |
|---|---|---|---|
| sg1 | 0 | 0 | 0 |
| sg2 | 0 | 0 | 0 |
| sg3 | 0 | 500 | 700 |
| sg4 | 0 | 0 | 0 |
| sg5 | 0 | 0 | 0 |
| sg6 | 0 | 0 | 0 |
| sg7 | 0 | 0 | 0 |

*FIG. 7C*

| Locations<br>Attributes | Berlin | London | Tokyo |
|---|---|---|---|
| Order# | 0 | 500 | 700 |
| Customer# | 0 | 500 | 700 |
| Product# | 0 | 500 | 700 |
| Date | 0 | 500 | 700 |
| Item | 0 | 500 | 700 |
| ItemValue | 0 | 500 | 700 |
| TotalValue | 0 | 500 | 700 |
| Status | 0 | 500 | 700 |

*FIG. 8*

| Business sub-processes<br>Attributes | sg1 | sg2 | sg3 | sg4 | sg5 | sg6 | sg7 |
|---|---|---|---|---|---|---|---|
| Order# | 0 | 0 | 0 | 0 | 0 | 0 | 0 |
| Customer# | 0 | 0 | 0 | 0 | 1 | 1 | 0 |
| Product# | 0 | 0 | 0 | 0 | 0 | 0 | 1 |
| Date | 0 | 0 | 0 | 0 | 0 | 1 | 1 |
| Item | 0 | 0 | 0 | 0 | 0 | 0 | 0 |
| ItemValue | 0 | 0 | 0 | 0 | 0 | 0 | 1 |
| TotalValue | 0 | 0 | 0 | 0 | 0 | 1 | 0 |
| Status | 0 | 0 | 0 | 0 | 1 | 0 | 0 |

*FIG. 9A*

| Locations<br>Business sub-processes | Berlin | London | Tokyo |
|---|---|---|---|
| sg1 | 0 | 0 | 0 |
| sg2 | 0 | 0 | 0 |
| sg3 | 0 | 0 | 0 |
| sg4 | 0 | 0 | 0 |
| sg5 | 0 | 15 | 25 |
| sg6 | 13000 | 0 | 14000 |
| sg7 | 15000 | 0 | 0 |

*FIG. 9B*

| Locations<br>Attributes | Berlin | London | Tokyo |
|---|---|---|---|
| Order# | 0 | 0 | 0 |
| Customer# | 13000 | 15 | 14025 |
| Product# | 15000 | 0 | 0 |
| Date | 28000 | 0 | 14000 |
| Item | 0 | 0 | 0 |
| ItemValue | 15000 | 0 | 0 |
| TotalValue | 13000 | 0 | 14000 |
| Status | 0 | 15 | 25 |

*FIG. 9C*

| Locations<br>Attributes | Berlin | London | Tokyo |
|---|---|---|---|
| Order# | 0 | 335 | 469 |
| Customer# | 4290 | 339.95 | 5097.25 |
| Product# | 4950 | 335 | 469 |
| Date | 9240 | 335 | 5089 |
| Item | 0 | 335 | 469 |
| ItemValue | 4950 | 335 | 469 |
| TotalValue | 4290 | 335 | 5089 |
| Status | 0 | 339.95 | 477.25 |

*FIG. 10*

| Locations<br>Attributes | Berlin | London | Tokyo |
|---|---|---|---|
| Order# | 804 | 469 | 335 |
| Customer# | 5437.20 | 9387.25 | 4629.95 |
| Product# | 804 | 5419 | 5285 |
| Date | 5424 | 14329 | 9575 |
| Item | 804 | 469 | 335 |
| ItemValue | 804 | 5419 | 5285 |
| TotalValue | 5424 | 9379 | 4625 |
| Status | 817.20 | 477.25 | 339.95 |

*FIG. 11*

| Locations<br>Attributes | Berlin | London | Tokyo |
|---|---|---|---|
| Order# | 804 | 469 | 335 |
| Customer# | 5437.20 | 9387.25 | 4629.95 |
| Product# | 804 | 5419 | 5285 |
| Date | 5424 | 14329 | 9575 |
| Item | 804 | 469 | 335 |
| ItemValue | 804 | 5419 | 5285 |
| TotalValue | 5424 | 9379 | 4625 |
| Status | 817.20 | 477.25 | 339.95 |
| $\sigma$ | 20318.40 | 45348.50 | 30409.90 |

FIG. 12

| Locations<br>Business sub-processes | Berlin | London | Tokyo |
|---|---|---|---|
| sg1 | - | - | - |
| sg2 | - | - | - |
| sg3 | - | (1,2,3,4,5,6,7,8) | (1,2,3,4,5,6,7,8) |
| sg4 | - | - | - |
| sg5 | - | (2,8) | (2,8) |
| sg6 | (2,4,7) | - | (2,4,7) |
| sg7 | (3,4,6) | - | - |

FIG. 13

| Locations<br>Business sub-processes | Berlin | London | Tokyo |
|---|---|---|---|
| sg3 | - | (1,2,3,4,5,6,7,8) | (1,2,3,4,5,6,7,8) |
| | - | (1,2,3,4,5,6,7,8) | - |
| | - | - | (1,2,3,4,5,6,7,8) |
| sg5 | - | (1,2,8) | (1,2,8) |
| | (1,3,4,5,6,7) | (1,2,8) | - |
| | - | (1,2,8) | (1,3,4,5,6,7) |
| | (1,3,4,5,6,7) | - | (1,2,8) |
| | - | (1,3,4,5,6,7) | (1,2,8) |
| sg6 | (1,2,4,7) | - | (1,2,4,7) |
| | (1,2,4,7) | (1,3,5,6,8) | - |
| | (1,2,4,7) | - | (1,3,5,6,8) |
| | (1,3,5,6,8) | - | (1,2,4,7) |
| | - | (1,3,5,6,8) | (1,2,4,7) |
| sg7 | (1,3,4,6) | - | - |
| | (1,3,4,6) | (1,2,5,7,8) | - |
| | (1,3,4,6) | - | (1,2,5,7,8) |

*FIG. 14*

| Locations<br>Business sub-processes ($\sum$) | Berlin | London | Tokyo |
|---|---|---|---|
| sg3 | - | (1,2,3,4,5,6,7,8) | (1,2,3,4,5,6,7,8) |
| 45348.50 | - | 45348.50 | - |
| 30409.90 | - | - | 30409.90 |
| sg5 | - | (1,2,8) | (1,2,8) |
| 24397.50 | 14064.00 | 10333.50 | - |
| 35773.50 | - | 10333.50 | 25440.00 |
| 19368.90 | 14064.00 | - | 5304.90 |
| 40788.90 | - | 35484.00 | 5304.90 |
| sg6 | (1,2,4,7) | - | (1,2,4,7) |
| 29342.45 | 17089.20 | 12253.25 | - |
| 28669.15 | 17089.20 | - | 11579.95 |
| 23198.15 | 4033.20 | - | 19164.95 |
| 31418.20 | - | 12253.25 | 19164.95 |
| sg7 | (1,3,4,6) | - | - |
| 28017.50 | 7836.00 | 20181.50 | - |
| 18100.90 | 7836.00 | - | 10264.90 |

*FIG. 15*

METHOD AND SYSTEM FOR DYNAMICALLY CONFIGURING A RELATIONAL DATABASE

BACKGROUND OF THE INVENTION

1. Field of the Invention

The invention relates to a method and system for configuring a database, in particular by splitting data objects. This splitting process is frequently termed FRAGMENTATION in database technology. The invention furthermore relates to a method and system for distributing data objects in a database. This process is frequently termed ALLOCATION in database technology.

2. Description of the Related Art

In order to describe formally the data records in a database, data models were developed which map all data in the database and their inter-relationships. An example of such a semantic, or conceptual, data model is the "Entity Relationship Model" (ERM), A logical data model is derived from the semantic data model. Logical data models are the hierarchical data model, frequently also termed the "tree model", the object-oriented data model and the relational data model. A further distinction is made between centralized databases and distributed databases.

In H. F. Korth and A. Silberschatz: "Database System Concepts", McGraw-Hill, New York, 1986, various database concepts are presented and discussed. In a distributed database the data are stored on different storage means. Generally the data are even stored on different computers at different locations. The various computer systems are interconnected by way of a communications network, and are in contact with each other by various means of communication.

In S. Ceri: "Distributed Databases: Principles and Systems", McGraw-Hill, New York, 1984, and in H. Kudlich: "Verteilte Datenbanken: Systemkonzepte und Produkte", Siemens AG, Berlin, 1992, the principle of distributed databases is presented and various distributed database systems discussed.

In S. Ceri, S. Navathe and G. Wiederhold: "Distribution Design of Logical Database Schemas", IEEE Transactions on Software Engineering, Vol. SE-9, No. 4 (July 1983), Page 487–504, and in S. Ceri, B. Pernici and G. Wiederhold: "Distributed Database Design Methodologies", Proceedings of the IEEE, Vol. 75, No. 5 (May 1987), Page 533–545, suggestions for the design of logical database systems are discussed and design methodologies for distributed databases presented.

In R. Nussdorfer: "DRDA: Verteilte Datenbanken für heterogene Umgebungen", Datenbank Extra, publ.: U. Parthier: "DB2: Seine Tools, Neuerungen und M öglichkeiten", IT Verlag für innovative Technologien, Sauerlach, 1993, Page 23–27, the industry standard DRDA for distributed databases is described. The architecture specifies protocols and conventions which permit databases of different manufacturers to be linked.

The transition from the logical database schema to a physical database schema can be understood as a configuration of the database, and is for example performed by a Database Administrator.

In I. Fogg and M. Orlowska: "Valid Unbiased Fragmentation for Distributed Database Design", Computers Math. Applic. (UK), Vol. 25, No. 9, 1993, Page 97–106, various possibilities of fragmentation in distributed databases are presented. Not only horizontal and vertical fragmentation are presented, but also combination forms of those modes of fragmentation.

In J. A. Bakker: "A Semantic Approach to Enforce Correctness of Data Distribution Schemes", The Computer Journal (UK), Vol. 37, No. 7, 1994, Page 561–575, the Structured Query Language (SQL) and two Entity Relationship Models are examined in terms of their usability for data distribution. A new approach based on a semantic metamodel for fragmenting and allocating is described, wherein only two modes of horizontal fragmentation are permitted.

In relational databases the data are stored in the form of relations. The relations can also be seen as tables, wherein the attributes of the relations are frequently represented as columns of the tables.

In "Distributed Relational Database Architecture: Evaluation and Planning Guide", 2nd edition, Doc. No. SC26-4650-01, IBM, San Jose (Calif.), USA, 1993, and "Distributed Relational Database Planning and Design Guide for DB2 Users", Doc. No. GG24-3577, IBM, San Jose (Calif.), USA, 1991, both of which publications can be obtained through the offices of IBM Germany or the IBM Corporation, the architecture of distributed relational databases and design guidelines for distributed relational databases are described.

In Y. Zhang, M. E. Orlowska and R. Colomb: "An Efficient Test for the Validity of Unbiased Hybrid Knowledge Fragmentation in Distributed Databases", International Journal of Software Engineering and Knowledge Engineering (Singapore), Vol. 2, No. 4, 1992. Page 589–609, three modes of fragmentation of relational databases are described.

The progressing globalization of companies, together with the necessity of rationalizing production processes, is increasingly bringing about a reorganization of business processes and a consolidation of information systems.

In H. Heilmann: "Workflow Management: Integration von Organisation und Informationsverarbeitung", HMD, 176, 1994, Page 8–21, a business process is described as a delimitable, often partial process, which leads to the creation or exploitation of business output. In this, the main emphasis of the observation is on the dynamic flow of the process from its initialization through to completion. The term "workflow" is frequently used instead of the term "business process".

In F. Leymann and D. Roller: "Business Process Management with FlowMark", Digest of Papers, Cat. No. 94CG3414-0, Spring COMPCON 94, 1994, Page 230 to 234, the IBM FlowMark workflow management system is described. The possibilities of modeling business processes are presented, and the execution of workflow management is described. The IBM FlowMark product can be acquired through the usual channels from IBM Germany or the IBM Corporation.

Flatter organizational structures, such as those propagated under the term "Lean Management", can only be successfully introduced if the decision-making units have at their disposal all necessary information at the right time. This means that, in information technology, ineffective administrative work and complex and lengthy channels and periods of processing must be eliminated, as must island solutions.

Consequently, many companies are re-engineering their business processes in order to optimize them, are automating their standard business processes to improve their execution, and are attempting to unify their information systems on the basis of uniform and company-wide data models, in order to create ideal conditions in terms of information delivery.

The possibilities of modern databases, such as the IBM Database 2, for distributing the data of a logical database across different physical locations converge here to an excellent degree with the two corporate measures described above and with the global structure of many companies; IBM Database 2 can be acquired through the usual channels from IBM Germany or the IBM Corporation.

DISADVANTAGES OF THE STATE OF THE ART

The existing database systems support the distribution of data, but they provide no assistance whatever in determining how the data, observed from a semantic side, are to be distributed across the nodes. More especially, models which, based on customer requirements, produce a physical database schema by way of an "Entity Relationship Model" (ERM) do not deal with the aspect of distributing data, or only in terms of the mere possibility, without instructions as to how to do it.

OBJECT

The object of the invention is therefore to optimize the configuration of a database. The optimization should be system-controlled, and relate in particular to performance aspects. The configuration is also to be optimized in terms of cost.

A further object of the invention is to configure a database not only statically, as for instance on initial startup of the database, but also dynamically; that is, a system-controlled reconfiguration of the database during operation is to be made possible.

SOLUTION

The object is fulfilled by the methods, systems and use disclosed in the independent claims. Advantageous embodiments of the invention are disclosed in the associated dependent claims.

Experience shows that configuration of the database is controlled by the information as to which processes access the data objects of the database in what way and to what extent. In particular, the configuration of distributed databases is controlled by the information as to which processes read from and write to which attributes of the relations, at what frequency.

The database can be configured both on initial startup and dynamically during database operation, in order to respond to changed user behavior for instance.

The method described in claim 1 fulfills the object of the invention by collecting and storing the database accesses, and by splitting the data objects.

The processes which access the data may, for example, be user inquiries to the database or computer programs which access the data in the database as part of their run sequence; the processes may, in particular, be computer programs controlled by a workflow management system.

The database may be hierarchical, object-oriented or relational. It may also be centralized or distributed. The data are stored in digital form, in any way technically possible. The data may, in particular, be stored electronically such as in semiconductor memories, magnetically, optically, or in a combination of those methods.

The data objects are determined according to the database schema; that is to say, they may represent the tree structure of a hierarchical database schema, the data objects in an object-oriented database schema, or the relations in a relational database schema.

The collecting of accesses onto the databases includes the determining of whether a process accesses the data in the database in a read or write operation. If the accesses of a workflow management system onto the database are observed, the workflow management itself often provides the facility for delivering the access information by type and scope. The access information can be stored by any known method or technique; in particular electronic, magnetic or optical storage is conceivable.

The database can also be configured, in particular, by splitting the data objects in it. The data objects can be split both with and without redundancy. It is, in particular, conceivable that the different parts of the data object each have a key element, so that it is possible to reconstruct the original data object precisely.

The method disclosed in claim 1 provides for an advantageous configuration of a database based on the logical database schema and on the information relating to the accesses onto the database. Configuration according to appropriate criteria permits the necessary database resources, such as processors or storage systems, to be reduced. This provides the benefits of less space requirement, lower energy consumption, higher reliability and lower costs. Configuration according to appropriate criteria also permits the performance capability of the database to be increased while the costs of the database system remain unchanged, or are even reduced.

In an embodiment of the invention in accordance with the method disclosed in claim 2, the invention provides a dynamic reconfiguration of the database. This is advantageous because in this way the database configuration can be dynamically adapted to the changes in database inquiries. As a result, an advantageous consistently high database standard is guaranteed, for example in terms of performance, reliability and cost.

In a further embodiment of the invention in accordance with claim 3, a data object which two processes want to access simultaneously is split. This is advantageous because the performance capability of the database is increased; blocking of a data object for all other database processes by a process only accessing one part of the data object is prevented by the characteristics of claim 3.

In a further embodiment of the invention in accordance with claim 4, the relational database offers the advantage that the relational mapping of the data in the database is more realistic than many other logical database models. This permits a high processing speed in database accesses, The data objects are represented by relations, which have attributes. The splitting of data objects is represented by the splitting of relations, wherein each part is assigned a key attribute to enable the overall relation to be reconstructed precisely and in full. A relation can in particular be split when processes simultaneously attempt to access an attribute. In this way, both processes will in future be able to access separate parts of the relation simultaneously in an advantageous manner.

In a further embodiment of the invention in accordance with claim 5, the database is a distributed database. This is advantageous because many database applications are distributed across different locations, so a distributed database can not only improve the performance capability of the database by means of shorter transmission paths, but can also reduce the data transmission costs.

To this end, the method in accordance with the invention distributes data objects and parts of data objects, and allocates them at the relevant locations. The use of distributed databases also offers advantages because smaller processors and storage systems can be deployed, offering high reliability and availability and involving low acquisition and operating costs.

In a further embodiment of the invention in accordance with claim 6, the information relating to the location of the database accesses is collected, stored and used for configuration of the database. This is advantageous because, in the case of distributed databases, it can be applied to take into account an important criterion for configuration of the distributed database. This location information may be provided in an advantageous manner by a workflow management system which has already stored this information at least in part.

In a further embodiment of the invention in accordance with claims 7 and 8, the database is a distributed relational database. The processing of the information in matrix form is advantageous because complex calculations can be carried out with little addressing effort, and so with little time consumption. A further advantage is that the result matrix contains all data relevant to a configuration of the database in a clear, concise and easily processable way.

In a further embodiment of the invention in accordance with claim 9, a weighting function is applied to the result matrix. This is advantageous because the configuration of the database can be controlled and optimized according to the respective weighting function. For example, an appropriate first weighting function can specifically optimize the database configuration for short processing times.

Likewise, for example, an appropriate second weighting function can optimize the configuration in terms of low data transmission or management costs. Other weighting functions may take account of safety-related aspects, company-specific aspects, local aspects, priorities and the like. Any combination of forms is also conceivable.

In a further embodiment of the invention in accordance with claim 10, a distribution function is used to specify the distribution of the data objects. This distribution function can specify distribution according to the various aspects, which can also be altered.

The weighting and distribution functions are applied to the result matrix according to the rules of matrix calculus known in mathematics, and thus in an advantageous manner permit complex situations to be taken into account in a short time with only a low level of required computing power. A further advantage is that the weighting and distribution functions can be easily adapted to changing background conditions, and dynamic reconfiguration of the database system with little effort is thus ensured.

The systems described in claims 11 to 16 disclose in particular a computer system which is capable of executing the method as described in claims 1 to 10.

Consequently, the systems involve the same advantages as already cited in relation to the associated methods.

Likewise, the data carrier described in claim 17 involves the same advantages as already cited in relation to the associated methods.

Furthermore, the invention in accordance with claim 18 relates to the use of information concerning data accesses onto a database for configuration of the database. This is advantageous because, in this way, precisely the optimal database configuration for the current database inquiries is determined. A further advantage of this is that, as a result, dynamic reconfiguration of the database is possible with little effort, in an automatable and flexible manner.

BRIEF DESCRIPTION OF THE DRAWINGS

An embodiment of the invention is shown in the drawings, and is described in more detail in the following.

FIGS. 6A to 6C show which business sub-processes access the attributes with what frequency;

FIGS. 7A to 6C show the frequency with which business sub-processes access locations;

FIG. 8 shows the relationships between locations and attributes for the write operation;

FIGS. 9A to 9C show the relationships between locations and attributes for the read operation;

FIG. 10 shows the relationships between locations and attributes for the overall accesses;

FIG. 11 shows the total costs in accordance with the line optimum method;

FIG. 12 shows the total costs in accordance with the column optimum method;

FIG. 13 shows clusters of attributes at locations on the basis of the business processes;

FIG. 14 shows selected clusters of attributes at locations on the basis of the business processes;

FIG. 15 shows a cost assessment of selected clusters of attributes at locations on the basis of the business processes.

BRIEF DESCRIPTION OF THE PREFERRED EMBODIMENTS

Figure 1:
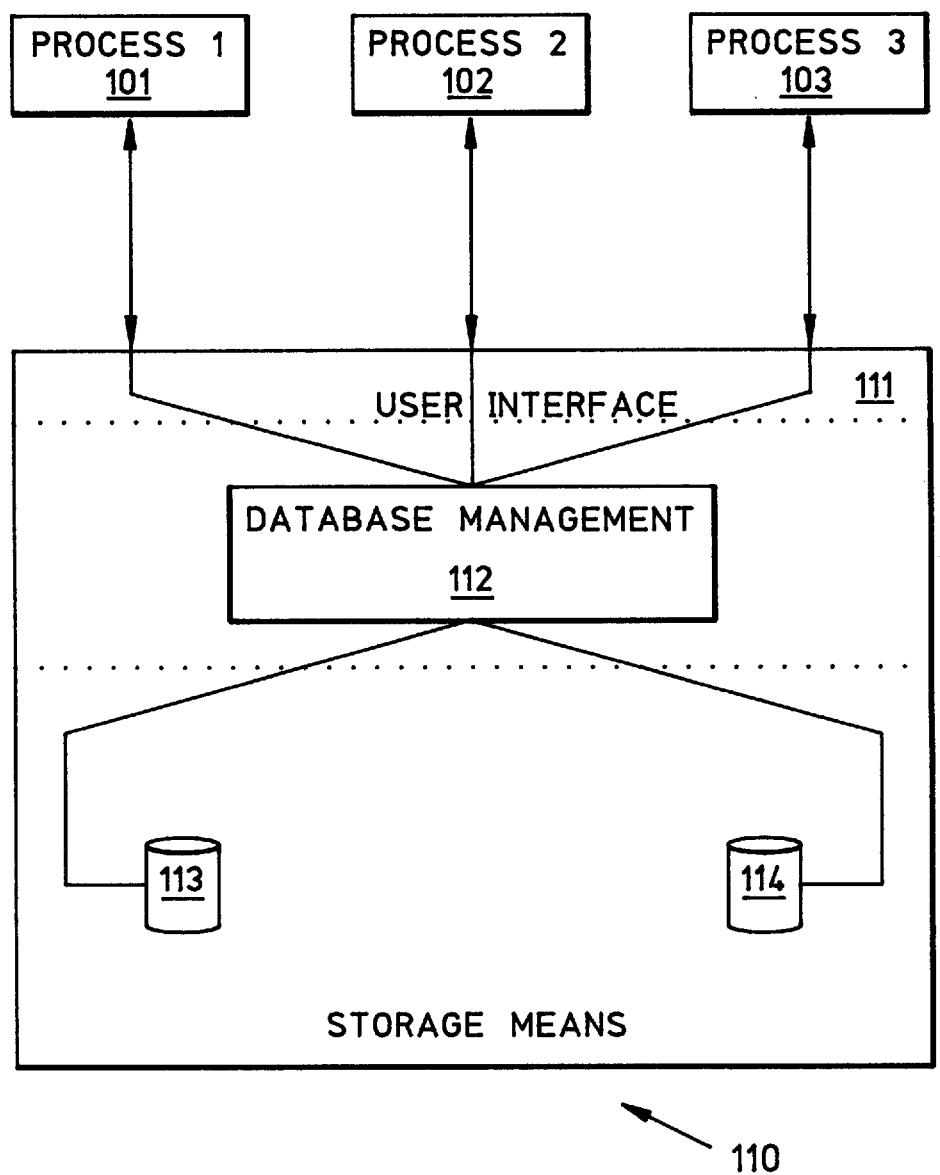
FIG. 1 shows a database onto which various processes access.

FIG. 1 shows a database 110 onto which the processes 101, 102 and 103 access. In this, the processes communicate with the user interface 111 of the database 110. The database management 112 manages the data in the database 110, which are stored in the storage means 113, 114. Database management also involves configuration, including the definition as to which storage means 113, 114 is to be used, in what way, and in what structure, to store the data. The processes 101, 102 and 103 may be user inquiries to the database 110 or computer programs which access onto the database 110. In particular these processes 101, 102 and 103 may also be business processes of a company which are controlled by a workflow management system and access onto the database 110 as user interactions or as application programs.

Figure 2:
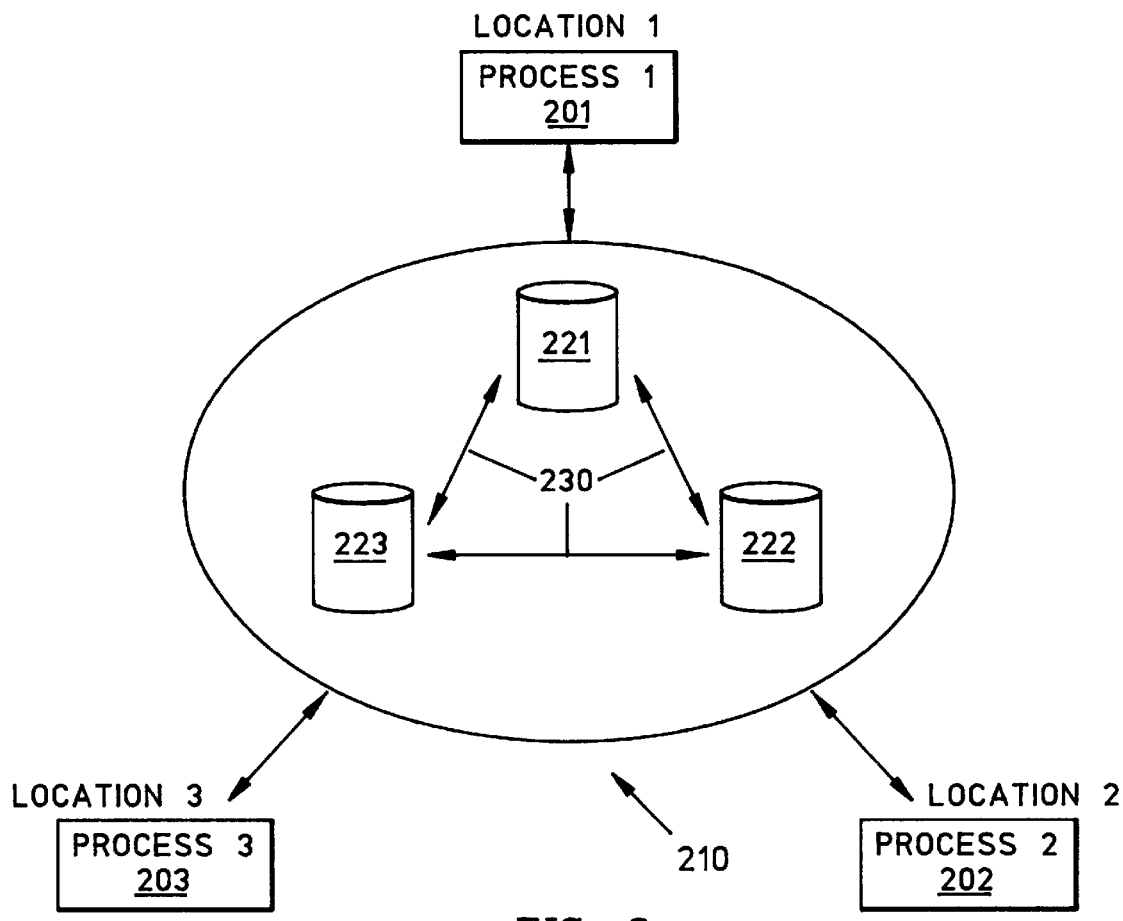
FIG. 2 shows a distributed database in which the data are distributed across storage means.

FIG. 2 shows a distributed database 210, in which the data in the database 210 are distributed across the storage means 221, 222 and 223. The storage means 221, 222 and 223 may be distributed within a database computer, across different computers at one location, across different computers at different locations, or globally distributed. The distribution of the data, and the storage means, reflects the application of the database and the distribution of the processes 201, 202 and 203 which access onto the distributed database 210. The storage means 221, 222 and 223 communicate with each other over appropriate data lines 230. These data lines 230 may exist within the case of a database computer, or may be international data lines such as conventional telephone lines. The data interchange may be by wire or wireless, electronic or optical.

Figure 3:
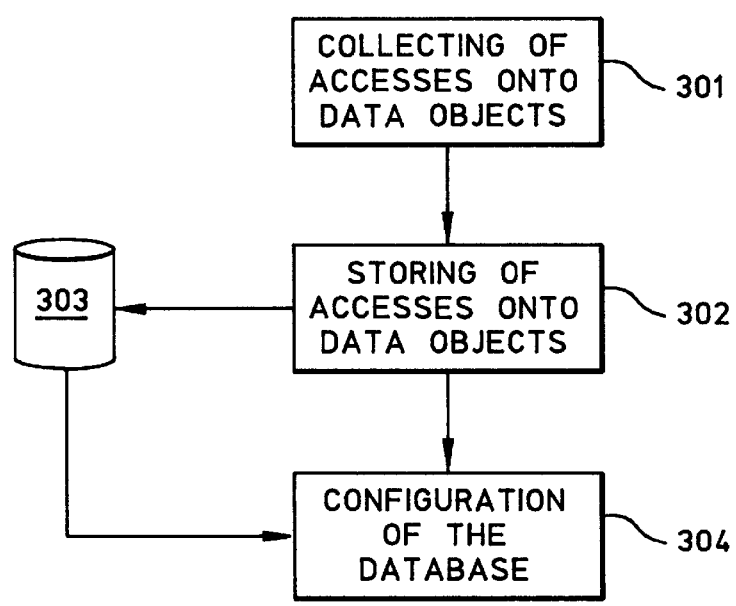
FIG. 3 shows the schematic of the method of configuring a database in accordance with the invention.

FIG. 3 shows the schematic of the method of configuring a database in accordance with the invention. The accesses onto the data objects of the database are first collected 301. Then these accesses are stored 302 on a storage means 303. Then the database is configured using the information relating to the accessing of the data objects of the database 304. The configuration may be performed by the database management 112 of the database 110 (see FIG. 1) or by control devices external to the database.

Figure 4:
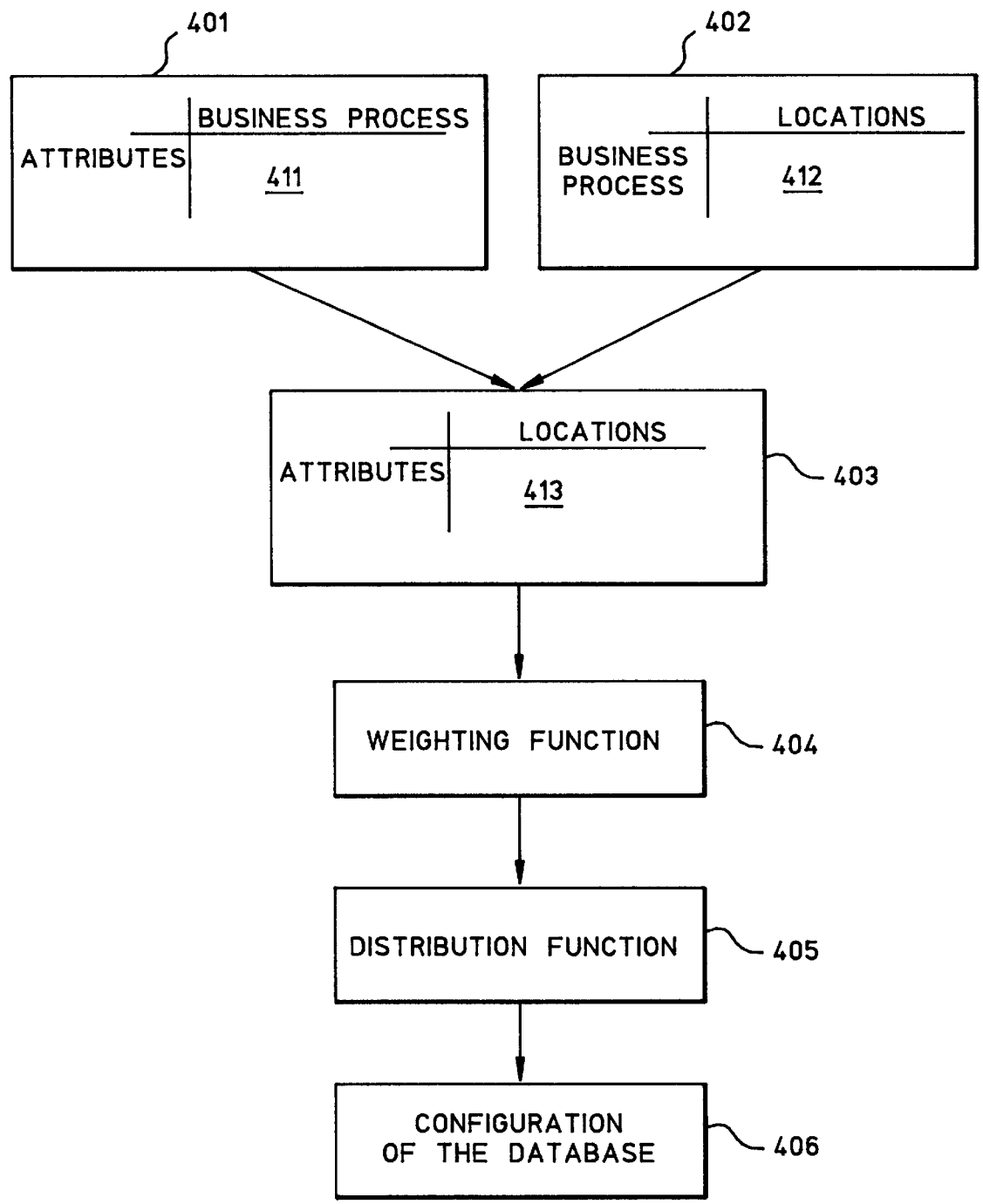
FIG. 4 shows the method in accordance with the invention where the database is a distributed relational database.

FIG. 4 shows the method in accordance with the invention where the database is a distributed relational database onto which business processes access. In this case, in a first information block in the form of a first matrix 401, the information 411 is stored as to which business process accesses which attributes of a relation in the distributed relational database, with what frequency and in what way. In terms of the mode of access, for example, a distinction is made between read and write access. In a second information block, in the form of a second matrix 402, the information 412 is stored as to which business process takes place at which location with what frequency.

The first matrix 401 is multiplied by the second matrix 402 according to the mathematical rules of matrix calculus, producing a result matrix 403 which contains the information 413 indicating from which location which attribute of a relation in a distributed relational database was accessed, with what frequency and in what way.

In a next step a weighting function 404 is then applied to this information 413, producing a weighted result matrix. This weighting function 404 takes into account the speed at which a specific attribute of the relation can be accessed from a specific location, for example. This weighting function 404 can also take account of the transmission cost for transmission of an attribute from the storage location of the attribute to the location of the business process scanning the said attribute. This weighting function can also take account of the storage cost at a location for storage of a specific attribute.

Then a distribution function 405 is applied to the weighted result matrix, defining a distribution of the relations across the various storage means, or various storage locations, of the distributed relational database. This distribution function 405 takes into account, for example, specific database structures, existing computer networks, the availability of existing links, or company-specific structures, priorities, circumstances or requirements. During configuring 406 of the database, the data are distributed across the various storage means. Where required, and where possible, the distribution function 405 can also be applied directly on the basis of the result matrix 403. The application of a weighting function 404 should be seen as a option to the method in accordance with the invention.

Figure 5:
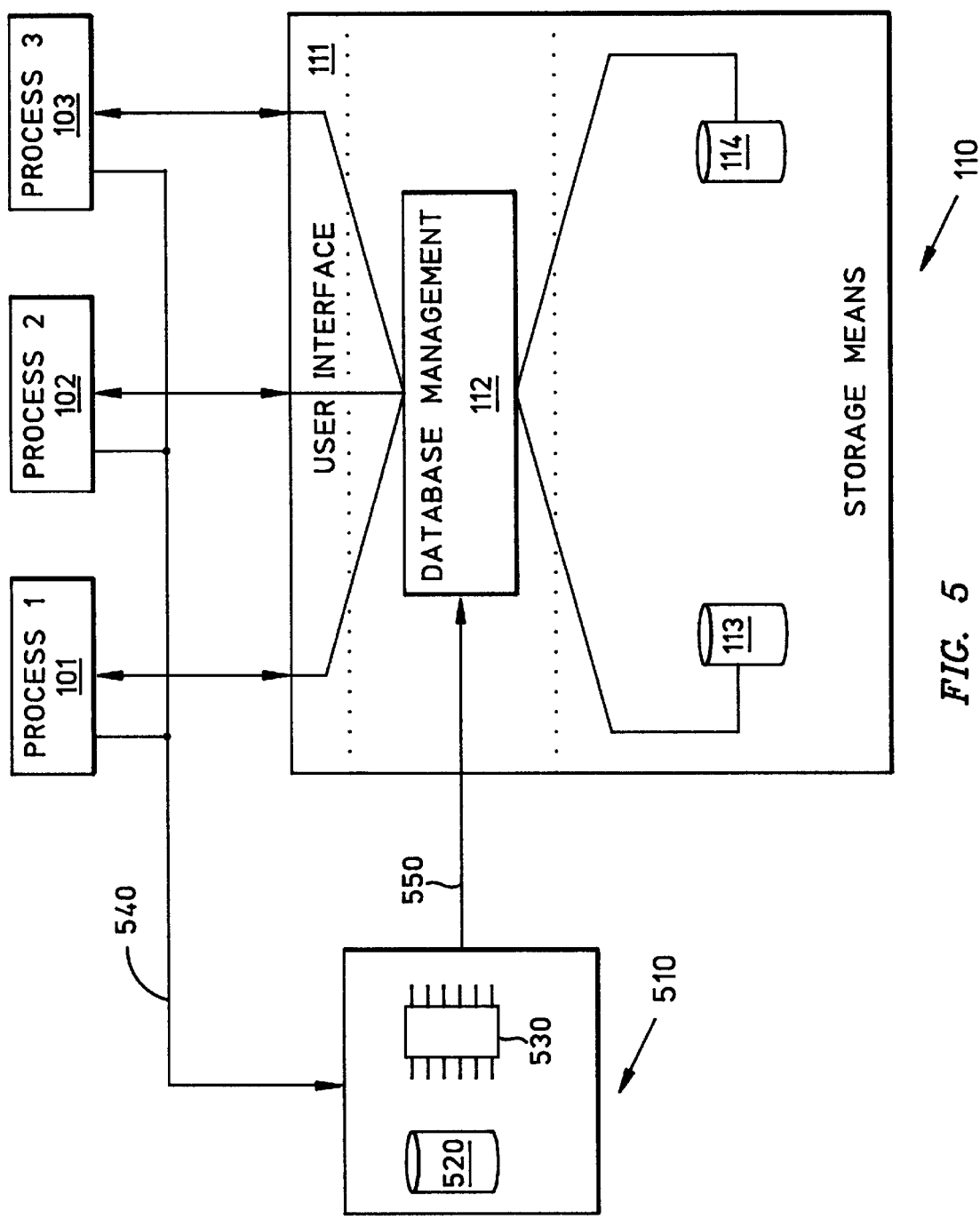
FIG. 5 shows a system 510 for splitting data objects in a database.

FIG. 5 shows a system 510 for splitting data objects in a database 110. With regard to the database 110 the points set out under FIG. 1 apply. By means of the system 510 the accesses of the processes 101, 102 and 103 onto the data objects are determined by way of a data link 540. The system 510 is preferentially realized by a computer system, and has a processor unit 530 and storage means 520. The system 510 controls the database management 112 of the database 110 over control lines 550, and in this way controls the splitting, or distribution, of the data objects in the database 110.

The following figures show an embodiment of the invention for the configuration of a distributed relational database, for example relating to the product database of a multinational company. In this example seven business sub-processes sg1 to sg7 access the eight attributes Order#, Customer#, Product#, Date, Item, Item Value, Total Value and Status, of the relation ORDER. The database is accessed from the locations Berlin, London and Tokyo, Business sub-processes are units in one or more business processes, which are seen as the smallest units accessing data. If no business processes or sub-processes are yet defined, they are derived from the applications. In the following access of the business sub-processes onto the individual attributes of a relation is recorded. This step is required because, depending on the optimization method used, it may be necessary to observe clusters of the attributes of a relation in order not to break apart units within a relation which are jointly processed by business sub-processes.

The choice of time period depends on the business processes under examination, and can therefore not be generally defined for all cases. For example, a company's financial year may be applied as the period, if the annual financial statements are to be incorporated into the analysis. If such a long period does not need to be observed, the period can be switched to days or shorter times. The only important factor is that the period is a unit of measurement within the analysis which must be seen as standardized.

A distinction is made between different read access operations onto attributes:

in the following R1 designates a read operation needed for a data update or data deletion. In FIG. 6A the information as to which business sub-process accesses which attribute of the relation ORDER with what frequency in a R1 read operation is shown in matrix form.

A distinction is made between this and the R2 read operation, which is used to record "only" read operations. This distinction is necessary for technical reasons within the database. In FIG. 6B the information as to which business sub-process accesses which attribute of the relation ORDER with what frequency in a R2 read operation is shown in matrix form.

A further distinction is made, in a write operation W. In FIG. 6C the information as to which business sub-process accesses which attribute of the relation ORDER with what frequency in a write operation is shown in matrix form.

In the following step the access frequencies of the business sub-processes at the various locations are analyzed. In FIG. 7A the locations which the business sub-processes access in a R1 read operation, with what frequency, are shown in matrix form.

Accordingly, in FIG. 7B the locations which the business sub-processes access in a R2 read operation, with what frequency, are shown.

In FIG. 7C the information as to which location which the business sub-processes access in a write operation, with what frequency, is shown.

With the first step described: determining of the ratio of business sub-processes to attributes of a relation, and the second step described: determining of the relationship between business sub-processes and locations, a ratio of locations to attributes can be derived which is fundamental to the distribution of data, because it does indeed contain precisely the required information Location: Attributes/ Relation.

The matrix shown in FIG. 8 is calculated by multiplication of the matrix in FIG. 6C by the matrix in FIG. 7C. This matrix shown in FIG. 8 contains the information as to the frequency with which the individual attributes of the relation ORDER are accessed from which locations in a write operation.

The procedure in relation to the read operations is similar to the case of the write operation. The only exception is that, first, the matrices for R1-Read and R2-Read for the link between business process and attribute are added together; that is to say, the matrices from FIGS. 6A and 6B are added together. The resulting first total matrix is shown in FIG. 9A.

Then the matrices R1-Read and R2-Read for the link between business processes and locations are added together; that is to say, the matrices from FIGS. 7A and 7B are added together. The resulting second total matrix is shown in FIG. 9B.

Then the matrix shown in FIG. 9C is calculated by multiplication of the first and second total matrices in FIGS. 9A and 9B. This matrix shown in FIG. 9C contains the information as to the frequency with which the individual attributes of the relation ORDER are accessed from which locations in a read operation.

The following describes an example of the method of distributing data across different locations. Based on the matrix in FIG. 8 with regard to the write operations and the matrix in FIG. 9C with regard to the read operations, a matrix of the total access operations is now ascertained. The distinction between read and write access becomes relevant at this point. Parameters α and β are then introduced, producing a weighting between read and write access. This parameterization is in response to the fact that, for example, distribution of the data taking account only of the read or write operation is conceivable; as is a distribution which takes account of the two operations with widely differing significances. The two parameters can also be used to take account of the differing transmission costs for read and write operations.

In the present example the parameters a and b are chosen such that the write operations are assigned twice the significance of the read operations. The read operations are thus weighted with a parameter α=0.33, whereas the write operations are weighted with a parameter δ=0.67. This produces the matrix of total accesses for the relation ORDER, as shown in FIG. 10. This matrix forms the basis for the further analyses.

The matrix of total accesses, in which the various access modes are brought together as determined above, helps to simplify observation of the method in accordance with the invention, and thus aids clarity. One could without doubt also perform the cost analyses incorporated in the weighting function (see the cost functions described in the following) on the basis of the various modes of access; however, the resulting complexity represents no new quality in terms of the invention, it is merely a refinement.

For determination of the optimal distribution within the methods presented, and ultimately beyond the methods to a global optimum, definition of a cost function is required. This may take into account:

The total costs of a specific attribute of the relation when stored at a specific location;

The storage costs of the attribute of the relation at the said location, whereby the storage costs may vary depending on the location;

The access costs of the attribute of the relation at the said location, whereby the access costs also include the transmission costs and must therefore be dealt with separately according to location;

The access frequency of the attribute of the relation at the said location from another location;

The average data transfer volume when the attribute of the relation is accessed at the said location from another location;

The storage costs of the attribute of the relation at the said location.

In the present example, for reasons of clarity and simplicity, the following assumptions are made:

The storage costs are not taken into account;

The access costs at the various locations do not differ;

The data volume is not taken into account.

Based on the matrix shown in FIG. 10, this results in the weighted result matrix shown in FIG. 11.

The following procedures for distributing the data are to be examined:

Line optimum method: An attribute of a relation is assigned to the location at which the lowest costs are incurred.

Column optimum method: The totality of accesses onto a relation at a location is analyzed, and the relation as a whole is placed at the location at which the lowest costs are incurred.

Full attribute clustering: All possible clusters of attributes of a relation are formed and distributed across the various locations. The resulting quantity of distribution variants increases exponentially and therefore involves intensive computing. The line optimum method and the column optimum method are special cases of this maximum clustering.

Attribute clustering based on the business processes: to avoid the problem of the exponentially increasing number of clusters in the procedure described above, a filter is inserted here which is derived from the business processes themselves. Only the distributions of clusters and locations which are actually used by the business processes are analyzed.

Each vertical fragment must be assigned the key attribute as an additional attribute. The possibilities of copies and of horizontal splitting are not examined.

The following presentations relating to the distribution methods produce differing results. The optimal distribution is determined by means of the cost function. The cost function is applied to the individual attributes and their possible distribution locations. This creates a new matrix containing the respective costs per attribute and location incurred by the other locations if they have to access that location, and additionally the storage costs at the said location.

The line optimum method is based on the concept that the attribute of a relation should be at the location at which the costs for the said attribute are minimal. The weighting function is applied to the simple clusters, that is to say to the individual attributes. This means that the relevant line optimum index must be defined per attribute of the relation, weighted by the cost function. The index then indicates at which location which attribute is to be stored. If the information is not unambiguous, the selection can be made from among the various equivalent minimums, for example based on the lowest column ranking. The only essential factor is that the result of selection is unambiguous. The line optimum method represents a first distribution suggestion.

In the present example the line maximum method based on the matrix in FIG. 11 produces a physical distribution of the attributes of the relation ORDER as follows:

Berlin: Product#, Date and Item Value

Tokyo: Order#, Customer#, Item, Total Value and Status.

The total costs amount to 18,100.9 cost units.

The column optimum method is based on the concept that in each case the entire relations are placed at the location which incurs the lowest overall costs. This means that the sum total costs per location must be formed, and the minimum then selected. The starting point for this method is the weighted result matrix shown in FIG. 11, which was created by the total cost function. If the minimum does not clearly specify one location, other criteria must be found. In the present example the matrix shown in FIG. 12 is produced. According to the column optimum method, the entire relation ORDER should be placed in Berlin. The total costs in this case amount to 20,318.4 cost units.

The attribute clustering method to generate unique, vertical splits is executed in two procedures. In the first procedure the quantity of all possible combinations of attributes of a relation is analyzed and a function defined; they are then systematically distributed in all combinations across the possible locations. This procedure is termed "full attribute clustering" in the following. The weighting function is applied to select the distribution variant involving the lowest costs.

In the second case an analysis is first made of which clusters are used at all by business sub-processes, and at which locations in each case. For the sake of simplicity, no distinction is made here between read and write operations of the clusters.

A relation with a certain number of attributes is to be split as a unicum. The key of the relation is to consist of only one attribute, although the procedure does not change for keys consisting of several attributes of a relation because the key in its entirety is part of each fragment. The number of possible clusters in full attribute clustering results as a cardinal number of the quantity of combinations of elements without repetition, without taking into account the arrangement.

The possible clusters must now be selected such that a full coverage of the relation results.

These possible full coverages must be permutated across the locations in the final step. The weighting function can then be applied to the resulting distributions of clusters across locations, to calculate the costs incurred in this cluster distribution. The optimal cluster is selected according to the least-cost principle; where clusters involve the same cost, other decision-making criteria must be found.

The method presented thus far attempts to optimize by way of all possible combinations of clusters and their distributions across locations. The number of possible clusters alone excluding the combinations of those clusters across various locations for only one relation increases exponentially. For this reason a filter is suggested which, from the very beginning, only takes account of the clusters which are actually used by the business processes.

In contrast to the exponential increase in possibilities involved in the full attribute clustering method, in attribute clustering based on the business processes the scope for potential clusters is restricted by the business processes. If a cluster of attributes of a relation is only required at one location, it does not make sense to place that cluster as such at other locations. This does not affect the possibility, based on partial-quantity relationships between the clusters, that an overall quantity of a cluster may be placed at a location where no inquiry is made of the sub-set quantity. In this, the restriction to clusters actually used by the business processes represents a sensible reduction of options.

Attributes which do not belong to a cluster of a business process can either be distributed across the remaining locations in all possible combinations or, as a sensible special case, be distributed as a block across the other locations. This special case makes sense in that it creates the largest possible blocks of attributes. Following definition of the possible modes of distribution across the locations, the weighting function is applied to determine the optimal distribution, as in full attribute clustering.

In the present example the clusters shown in the matrix in FIG. 13 result from the matrices in FIGS. 6A, 6B, 6C, 7A, 7B and 7C. For reasons of clarity, only the indices of the attributes of the relation ORDER are used.

Thus, taking into account the fact that the key attribute "1" must always be part of the fragment, the remaining attributes are placed in full as examples at the remaining locations. This corresponds to the special case described: the matrix shown in FIG. 14.

If the weighting function is applied to the matrix in FIG. 14, the weighted result matrix shown in FIG. 15 is produced. The optimal distribution of attributes resulting from this matrix is:

Berlin: Order#, Product#, Date and Item Value
Tokyo: Order#, Customer#, Item, Total Value and Status.
The total costs amount to 18,100.9 cost units.

We claim:

1. A method for configuring a relational database (110) distributed over a plurality of storage means (221, 222, 223), wherein the database (110) comprises relations of the database, the relations having attributes, the relations being represented by digital data and attributes of the relations being accessed by processes (101, 102, 103), characterized in that the method comprises:

configuring the database by allocating each relation as a whole to a respective storage means or allocating attributes of the relations to various of the storage means;

collecting (301) accesses of the processes on the attributes of the relations in a read operation and in a write operation;

storing (302) the collected accesses in a first matrix (401) in a first information block (303);

determining which processes are running at which location with what frequency:

storing information as to locations where, and with what frequency, the processes are running, in a second matrix (402) in a second information block;

multiplying the first and second matrices together to calculate a result matrix (403) containing information (413) as to which attribute of the relation is accessed from which location with what frequency in a read operation and with what frequency in a write operation, for a decision as to splitting of the relations and for a decision as to allocation of attributes of the relations; and dynamically configuring (304) the database (110) during operation of the database by splitting at least one relation in response to information in the first information block (303) that at least two processes are attempting to access the at least one relation simultaneously.

2. The method in accordance with claim 1, wherein at least one weighting function (404) is applied to the result matrix (403) and a weighted result matrix is calculated.

3. The method in accordance with claim 1, wherein a distribution function (405) is applied to the result matrix (403) or the weighted result matrix, which determines the splitting of the relations and which determines the distribution of the attributes of the relations across the various storage means of the distributed database (210).

4. A system (510) for configuring a distributed relational database (110) distributed over a plurality of storage means (221, 222, 223), wherein the database (110) comprises relations of the database, the relations having attributes, the relations being represented by digital data and attributes of the relations being accessed by processes (101, 102, 103), the system (510) comprising:

means for allocating each relation as a whole to a respective storage means;

first means (530, 540) the attributes of the relations, first storage means (520) for storing, as first information, the accesses of the processes onto the attributes of the relations;

second means for determining locations at which the processes are running;

second storage means for storing, as second information, the locations at which the processes are running;

first computing means for linking the first information and the second information together to form a result matrix; and means for configuring the database using the information in the result matrix.

5. The system (510) in accordance with claim 4, wherein the system also has second computing means which applies at least one weighting function to the result matrix.

6. The system (510) in accordance with claim 4, wherein the system is a computer system which is able to execute control functions on the database (110).

7. A data carrier which stores a computer program characterized in that the computer program controls a system in accordance with claim 4 and the computer system executes a method in accordance with claim 1.

8. A system (510) for configuring a distributed relational database (110) distributed over a plurality of storage means (221, 222, 223), wherein the database (110) comprises relations of the database, the relations having attributes, the relations being represented by digital data and attributes of the relations being accessed by processes (101, 102, 103), the system (510) comprising:

means for allocating parts of the relations to various of the storage means;

first means (530, 540) for collecting the accesses of the processes onto the attributes of the relations, first storage means (520) for storing, as first information, the accesses of the processes onto the attributes of the relations;

second means for determining locations at which the processes are running;

second storage means for storing, as second information, the locations at which the processes are running;

first computing means for linking the first information and the second information together to form a result matrix; and means for configuring the database using the information in the result matrix.

9. The system (510) in accordance with claim 8, wherein the system also has second computing means which applies at least one weighting function to the result matrix.

10. The system (510) in accordance with claim 8, wherein the system is a computer system which is able to execute control functions on the database (110).

11. A data carrier which stores a computer program characterized in that the computer program controls a system in accordance with claim 19 and the computer system executes a method in accordance with claim 1.

* * * * *